United States Patent
Kienzler et al.

(10) Patent No.: US 10,401,482 B2
(45) Date of Patent: Sep. 3, 2019

(54) OPTOELECTRONIC SENSOR AND METHOD FOR MEASURING A DISTANCE

(71) Applicant: SICK AG, Waldkirch (DE)

(72) Inventors: Stefan Kienzler, Waldkirch (DE); Martin Köhl, Waldkirch (DE); Kai Waslowski, Waldkirch (DE); Ulrich Zwölfer, Waldkirch (DE)

(73) Assignee: SICK AG, Waldkirch (DE)

( * ) Notice: Subject to any disclaimer, the term of this patent is extended or adjusted under 35 U.S.C. 154(b) by 371 days.

(21) Appl. No.: 15/343,851

(22) Filed: Nov. 4, 2016

(65) Prior Publication Data

US 2017/0184709 A1   Jun. 29, 2017

(30) Foreign Application Priority Data

Dec. 23, 2015 (EP) .................................. 15202272

(51) Int. Cl.
  *G01C 3/08* (2006.01)
  *G01S 7/486* (2006.01)
  *G01S 17/10* (2006.01)
  *G01S 7/487* (2006.01)

(52) U.S. Cl.
  CPC ............ *G01S 7/4865* (2013.01); *G01S 7/487* (2013.01); *G01S 17/10* (2013.01); *G01S 17/107* (2013.01)

(58) Field of Classification Search
  CPC ........ G01S 7/4865; G01S 7/487; G01S 17/10; G01S 17/107
  See application file for complete search history.

(56) References Cited

U.S. PATENT DOCUMENTS

| | | | |
|---|---|---|---|
| 3,644,043 A | 2/1972 | Jones et al. | |
| 4,938,592 A * | 7/1990 | Poole ................. | G01N 15/1459 356/335 |
| 2012/0075615 A1 | 3/2012 | Niclass et al. | |
| 2012/0162632 A1 | 6/2012 | Dutton | |

(Continued)

FOREIGN PATENT DOCUMENTS

| | | |
|---|---|---|
| DE | 102007013714 A1 | 2/2008 |
| EP | 2469301 A1 | 6/2012 |

(Continued)

OTHER PUBLICATIONS

European Search Report dated Jul. 8, 2016 corresponding to European application No. 15202272.9-1812.

*Primary Examiner* — Samantha K Abraham
(74) *Attorney, Agent, or Firm* — Nath, Goldberg & Meyer; Jerald L. Meyer; Stanley N. Protigal

(57) ABSTRACT

An optoelectronic sensor for measuring a distance comprises a light transmitter (20) for transmitting a sequence of individual light pulses (22) and a light receiver (26) for receiving the individual light pulses (24). An individual time of flight measuring unit (28) determines a sequence of individual times of flight of the individual light pulses (22, 24) as the duration between a transmission point in time and its reception point in time. An evaluation unit (30, 32) accumulates individual times of flight and determines a common measurement value for the distance from the accumulated individual times of flight. The evaluation unit (30) comprises a filter (36) for accumulating an individual time of flight only if it coincides, within a time window, with a preceding individual time of flight.

14 Claims, 2 Drawing Sheets

(56) References Cited

U.S. PATENT DOCUMENTS

Figure 1:
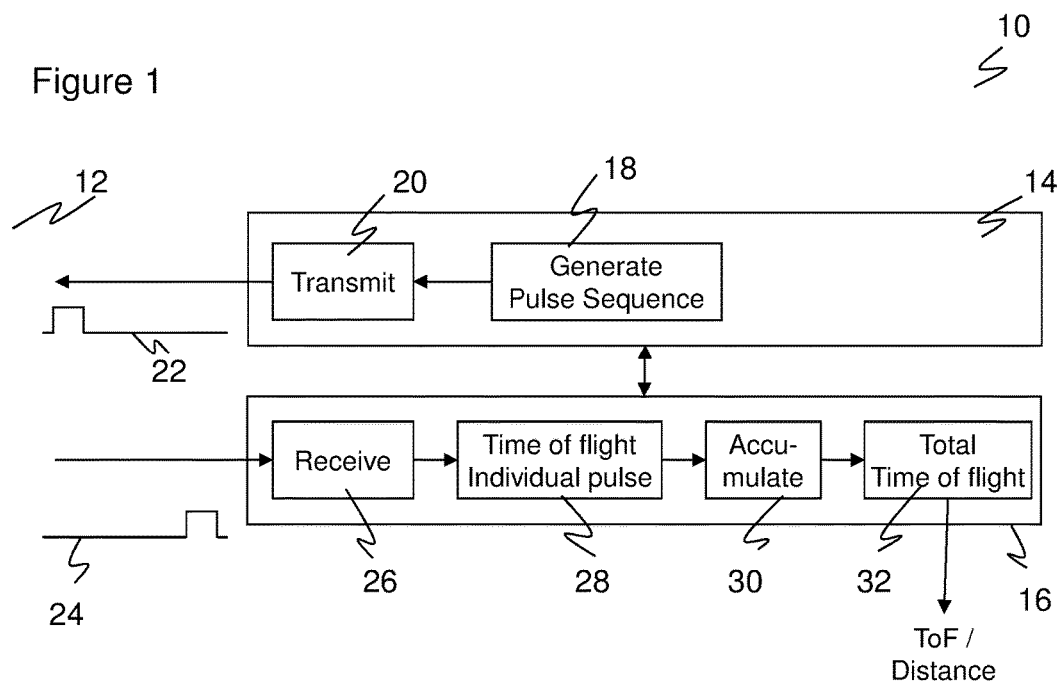

2013/0300838 A1    11/2013  Borowski
2014/0380112 A1*   12/2014  Pak .......................... H04L 47/27
                                                             714/748

FOREIGN PATENT DOCUMENTS

EP           2708913  A1    3/2014
JP        2014059302  A     4/2014

* cited by examiner

OPTOELECTRONIC SENSOR AND METHOD FOR MEASURING A DISTANCE

The invention relates to an optoelectronic sensor and a method for measuring the distance to an object in a monitoring area.

In a distance measuring optoelectronic sensor, a distance to the object is determined in addition to the object detection. Based on the distance information, three-dimensional images or so-called depth maps are also obtained provided the sensor is spatially resolving. For this purpose, a scanner scans the monitoring area with a light beam, while a 3D-camera in each of its pixels determines distance information instead of or in addition to the brightness information.

A conventional method for distance measurement is the measurement of the light time of flight (TOF). A short light pulse is transmitted, and the time until the reception of a remission or reflection of the light pulse is measured. In order to obtain a higher ro-bustness against interference and noise effects, it is known for example from DE 10 2007 013 714 A1 to sequentially transmit a plurality of individual light pulses, to accumulate the resulting reception signals in a histogram and to subsequently evaluate them commonly, for example by locating a maximum in the histogram from which the reception point in time is derived. This is also referred to as a pulse averaging method.

Such histogram evaluations solve the measuring problem, but require a lot of memory, since the complete time of flight expected in the measuring range is divided into bins whose width is at least similar to the desired measurement resolution. If the distance measurement is to be spatially resolved, as in a 3D-camera, this memory requirement in addition scales with the number of pixels, or the acquisition time increases significantly when the increased memory requirement is avoided by sequential processing of the pixels. This is particularly disadvantageous for the development of cost-effective integrated evaluation components, for example an ASIC (Application-Specific Integrated Circuit). The numerous memory cells in the counting process via histograms as explained determine the area requirements and also limit processing speed.

The detection sensitivity of simple photodiodes is not sufficient in many applications. In an avalanche photodiode (APD), the incident light triggers a controlled avalanche. The charge carriers generated by incident photons are multiplied, and a photo current results which is proportional to the reception light intensity, but is considerably larger than in the case of a simple PIN diode. In the so-called Geiger mode, the avalanche photodiode is biased above the breakdown voltage so that a single charge carrier generated by a single photon can already trigger an avalanche, which then recruits all available charge carriers due to the high field strength. The avalanche photodiode therefore counts individual events like the namesake Geiger counter. Avalanche photodiodes in the Geiger mode are also referred to as SPADs (Single-Photon Avalanche Diode).

The high sensitivity of SPADs also has disadvantages, since in the limiting case a single interfering photon or internal noise event provides the same signal as a distinctive useful signal. Multiple repeated measurement and common evaluation are therefore particularly advantageous when using SPADs.

It is therefore an object of the invention to provide a simpler evaluation for a pulse averaging method.

This object is satisfied by an optoelectronic sensor for measuring a distance to an object in a monitoring region, the sensor comprising a light transmitter for transmitting a sequence of individual light pulses into the monitoring region, a light receiver having at least one light reception element for receiving the individual light pulses reflected or remitted by the object, an individual time of flight measuring unit for determining a sequence of individual times of flight of the individual light pulses as a duration between a transmission point in time of a respective individual light pulse and its reception point in time detected by the light reception element and an evaluation unit for accumulating individual times of flight and determining a common measurement value for the distance from the accumulated individual times of flight, wherein the evaluation unit comprises a filter for accumulating an individual time of flight only if it coincides, within a time window, with a preceding individual time of flight.

The object is also satisfied by a method for measuring a distance to an object in a monitoring region, wherein a sequence of individual light pulses is transmitted into the monitoring region, the individual light pulses reflected or remitted by the object are received, a sequence of individual times of flight of the individual light pulses is determined as a duration between a transmission point in time of a respective individual light pulse and its reception point in time, the individual times of flight are accumulated and a common measurement value for the distance is determined from the accumulated individual times of flight, wherein by means of a filter an individual time of flight is accumulated only if it coincides, within a time window, with a preceding individual time of flight.

For a repeated individual measurement, a sequence of individual light pulses is transmitted, received again, and the respective individual (light) time of flight is determined, so that a corresponding sequence of measured values of the individual measurements is generated. The individual measurements are evaluated after accumulation in order to obtain a higher accuracy by a common measured value for the distance. The basic idea of the invention is to detect and filter out individual times of flight generated by noise events directly during the accumulation. For this end, only mutually approximately equal times of flight are taken into account during accumulation. This is based on the assumption that there are a relatively large number of individual times of flight which at least approximately correspond to the actual distance, whereas noise events tend to occur singularly. In particular, an individual time of flight is taken into account only when it coincides with a previous individual time of flight within a tolerance defined by a time window. The previous individual time of flight may for example be the direct predecessor in the sequence, but it can also be an earlier predecessor, or several predecessors can be considered. The match may also refer to quantities related to or derived from individual times of flight, such as distance values.

The invention has the advantage that high measurement accuracy is achieved by a similar concept as in a histogram evaluation, but without actually forming the memory-intensive histogram. The disadvantage of the high memory requirement is therefore avoided. Only minimal hardware costs are required, with a fast and even real-time evaluation being possible, since the individual times of flight are directly processed and therefore no accumulated histogram needs to be subsequently evaluated.

The evaluation unit preferably comprises an accumulator, in particular an adder, for adding up individual times of flight, and a counter for counting the number of added individual times of flight. Throughout this specification, the terms preferably or preferred refer to advantageous, but optional features. The numerous individual times of flight are thus stored as a sum and directly fed to a common evaluation. A simple adder having two registers for sum and count is sufficient for the implementation. The quotient of added individual times of flight and count forms the common measured value. This applies to each count in the form of an intermediate value, wherein the counter can also be used in a threshold evaluation to end the measurement. For example, it is added up until a thousand or any other preset number of individual times of flight has been added up.

A count can preferably be set in the evaluation unit from which on the filter, additionally or as an alternative, only allows accumulation of an individual time of flight if it coincides, within the time window, with the common measurement value. Beginning at an intermediate result, for example 10% or any other limit of the total individual times of flight to be accumulated, the filter criterion changes in this embodiment. Coincidence of individual times of flight no longer is considered alone, but the measurement result obtained so far complements or replaces that criterion. It is conceivable to weigh the previous measurement result the more the higher the count. In case that matching the measurement result within the time window is to become the only criterion, the switching can be carried out with a multiplexer.

The filter preferably comprises at least one subtracting stage for forming an absolute difference of individual times of flight and comparing the absolute difference with the time window. In this implementation, the filter preferably forms the difference of the current individual time of flight to be evaluated at that moment and an individual time of flight detected earlier, or a reference value generated therefrom, and the current individual time of flight is accumulated only if the absolute difference is small enough in a threshold evaluation. Thus, the filter can be implemented with very simple components.

The evaluation unit preferably comprises a buffer memory for at least one previous individual time of flight. The filter thus can access earlier individual times of flight in order to detect individual times of flight coinciding within the tolerance given by the time window. Depending on the design of buffer memory and filter, only one earlier individual time of flight or a longer history is buffered and taken into account.

The buffer memory preferably is configured as a sliding memory (e.g. FIFO, first in first out) for a plurality of previous individual times of flight, and the filter preferably only allows accumulation of an individual time of flight if it coincides, within the time window, with at least one of the stored previous individual times of flight. The individual times of flight passing through the buffer memory one after the other form a history which is stored in a very simple manner. The filter has a plurality of branches, preferably parallel and as many as storage locations in the sliding memory, in order to compare an individual time of flight to be evaluated with the buffered individual times of flight. A match with one or more of the buffered individual times of flight is then required to be taken into account during accumulation.

The evaluation unit is preferably configured to vary the time window during the accumulation of individual times of flight. Preferably, the time window becomes narrower. An embodiment with a variable time window is particularly advantageous in connection with a switching of the filter to the common measured value determined so far. Then, the time window converges to a cumulation of similar individual times of flight, and after this has been roughly localized relatively fast, the accuracy is increased over the further individual times of flight. Individual times of flight within too large a time window still taken into account would only interfere with the measurement result which already has been achieved.

The evaluation unit is preferably configured to adapt the time window based on at least one of the number of accumulated individual light pulses and the variance of the common measurement value. An adaptation to the count corresponds to the expectation as just described that a rough measured value is rapidly determined. The variance is a measure of the consistency of the contributing individual times of flight. If the variance is comparatively small, it can be assumed that deviating individual times of flight are interference events, which are then ignored with increasing strictness in the course of the further measurement. Since the individual times of flight are not stored according to the invention, a sum of the squared individual times of flight should preferably also be accumulated in addition to the sum of the individual times of flight in order to be able to determine the respective variance. An appropriate time window corresponding to a count and/or a variance can be specified in a function or table.

The individual time of flight measuring unit preferably comprises a TDC (time-to-digital converter). This is a known and relatively simple component, which can determine individual times of flight with high temporal resolution. The TDC is preferably started at the transmission point in time and stopped at the reception point in time by the received individual light pulse.

The light receiver preferably comprises a plurality of light reception elements and a plurality of individual time of flight measuring units assigned to the light reception elements individually or in groups. The light reception elements are preferably arranged in a line or a matrix. There are various circuitry variants. In the simplest case, it is merely averaged over all light reception elements. By temporal averaging over the individual light pulses and spatial averaging over the light reception elements, a more reliable measured value for the distance of the object is determined. Alternatively, each light reception element is individually evaluated, and a measured value for the distance of the object is determined. This results in a 3D image sensor. In a kind of hybrid, a plurality of light reception elements is combined in one averaging. This is also a 3D image sensor whose resolution, however, is reduced as compared to the total number of light-reception elements, and which in return provides a more reliable measured value for the distance of the object in its effective image pixels.

At least one light reception element preferably is an avalanche photodiode operated in a Geiger mode. These light reception elements, also referred to as SPADs, have already briefly been described in the introduction. The APDs (avalanche photodiode) are biased above their breakdown voltage, and the avalanche current can be triggered by a single photon. SPADs are therefore extremely sensitive, but they are also susceptible to erroneous measurements because the individual time of flight can erroneously be measured from the detection of an interference photon and thus be completely uncor-related with the distance of the object. For this reason, a statistical approach with interference event detection, such as the evaluation of individual times of flight according to the invention, is particularly useful for SPADs.

The evaluation unit is preferably at least partially integrated on the light receiver. For example, the light receiver is an ASIC with both the light reception elements and at least parts of the evaluation. The circuits for the evaluation according to the invention can be designed very simply. Only few memory cells and thus only a small area are required. This significantly facilitates integration. Preferably, a respective evaluation circuit with at least part of the evaluation unit is integrated into each light reception element or group of light reception elements and thus in the pixels or their vicinity, locally with each light reception element or group of light reception elements. The evaluation circuit may comprise only the individual time of flight measuring unit, but also the accumulator, counter and filter. Because of the simple circuits, a filling factor, that is, a ratio of the light-sensitive area to the total area of the pixel, of more than 20% is possible.

The inventive method can be modified in a similar manner and shows similar advantages. Further advantageous features are described in the sub claims following the independent claims in an exemplary, but non-limiting manner.

Figure 2:
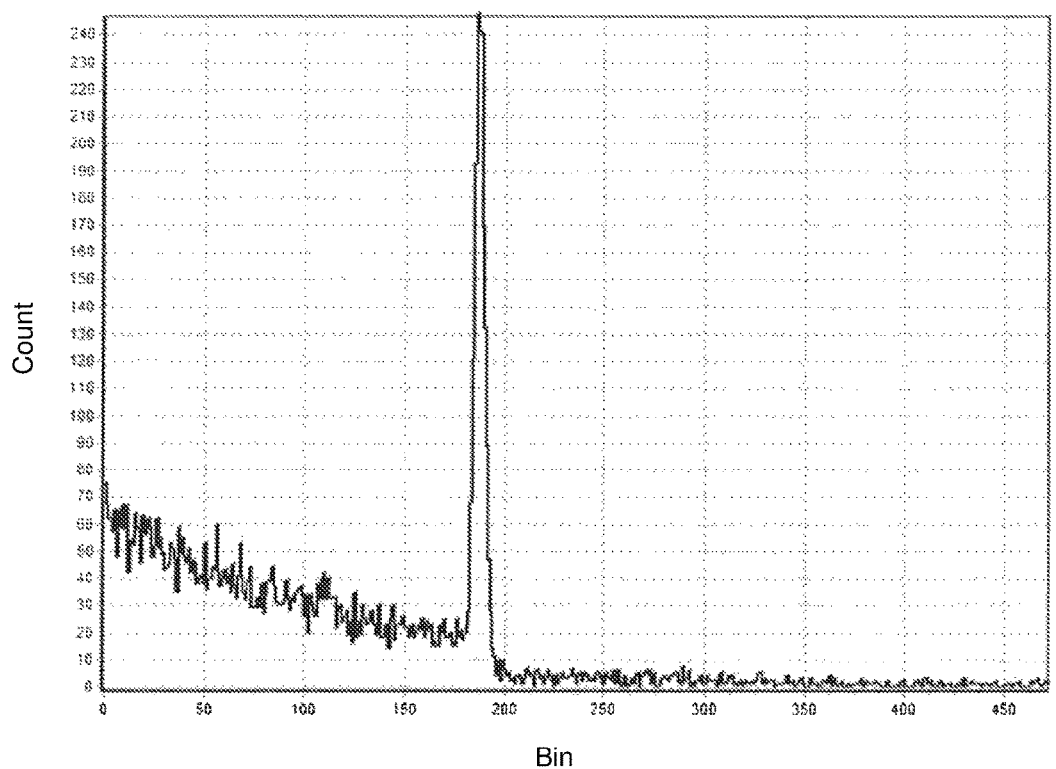
Figure 3:
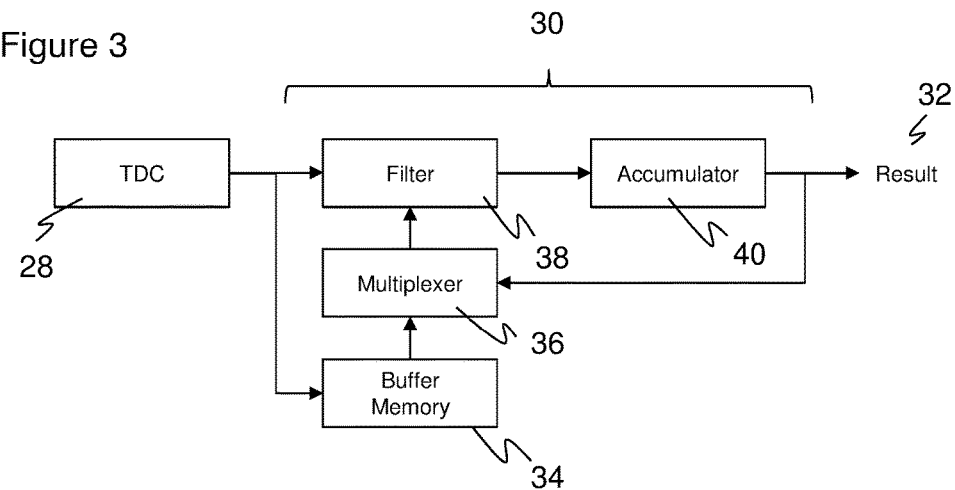
Figure 4:
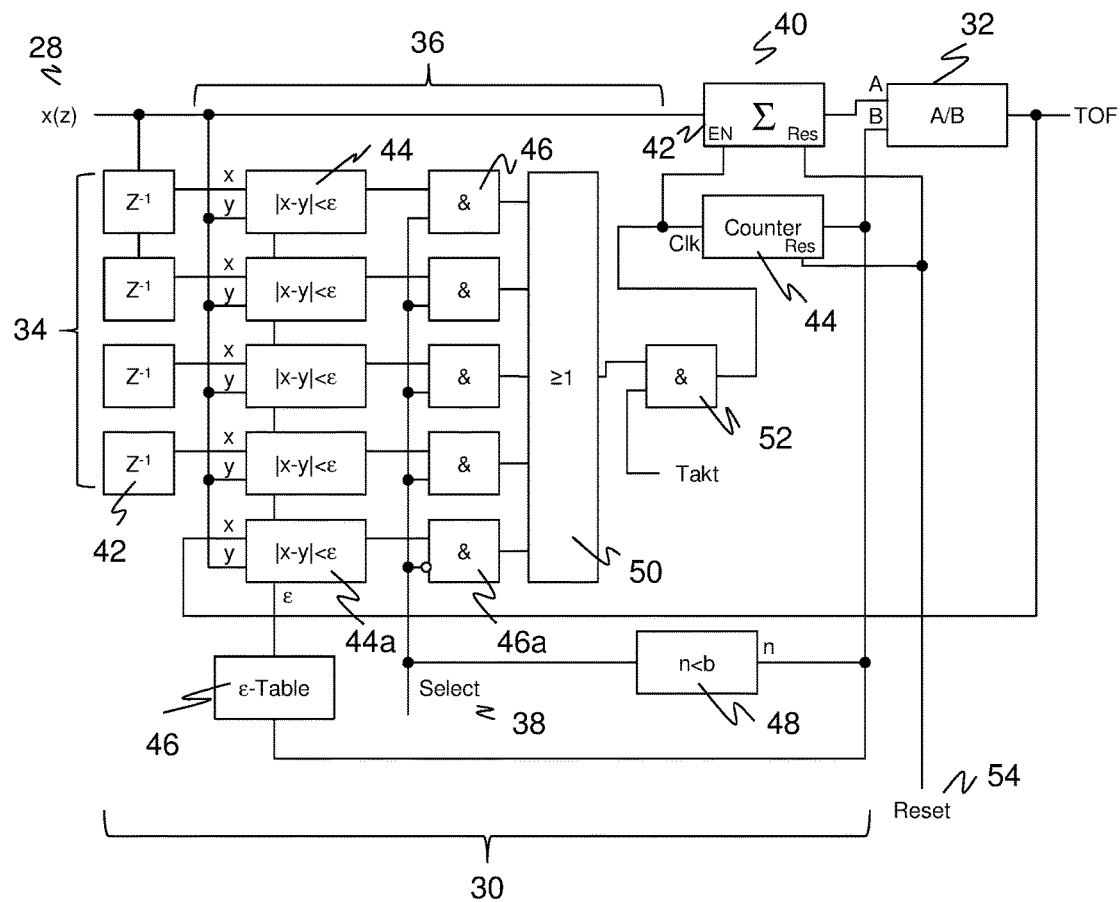

The invention will be explained in the following also with respect to further advantages and features with reference to exemplary embodiments and the enclosed drawing. The Figures of the drawing show in:

FIG. 1 a block diagram of a measuring core for determining the light time of flight from a sequence of individual light pulses;

FIG. 2 an exemplary histogram of a plurality of light times of flight measured with individual pulses;

FIG. 3 a block diagram of an embodiment of an evaluation unit for determining the light time of flight from at least approximately coinciding individual measurements; and FIG. 4 a block diagram of an embodiment for determining the light time of flight from at least approximately coinciding individual measurements taking a longer history into account.

FIG. 1 shows a simplified block diagram of a measuring core 10 for determining the distance to an object in a monitoring region 12 by measuring light times of flight. The measuring core 10 is divided into an upper transmission path 14 and a lower reception path 16 in FIG. 1. This division does not imply any technical characteristics. The invention relates primarily to the reception path 16, so that any known implementation is conceivable for the transmission path 14. The elements of the transmission path 14 can be separate components, but can also be integrated with the elements of the reception path 16 on a common component.

In the transmission path 14, a sequence of short individual pulses is generated with a pulse generator 18. The pulse widths and pulse lengths can be varied, for example for coding or adaptation to environment conditions. However, for the purposes of explaining the invention, the simpler concept of a uniform sequence of individual pulses which are sufficiently offset from one another in order not to influence the respective measurements suffices.

A light transmitter 20, for example an LED or laser diode, generates a corresponding sequence of individual light pulses 22 from the electronic transmission signal with the pulse sequence, which are transmitted into the monitoring region 12. If an individual light pulse 22 impinges on an object, a corresponding reflected or remitted individual light pulse 24 returns to the sensor with the measuring core 10 and impinges on the light receiver 26, which generates a corresponding electronic reception signal.

The light receiver 26 may be a simple photodiode or APD, but is preferably SPAD-based. The light receiver 26 comprises at least one light reception element, in particular a large number of light reception elements in a line or matrix arrangement. The spatial resolution may be preserved, so that a 3D image sensor results, or there is a spatial averaging over some or all light reception elements. The evaluation of a sequence of reception pulses from individual light pulses according to the invention is independent of how these events have been registered.

As a first evaluation step, the individual time of flight measuring unit 28 determines the respective individual time of flight between transmission of an individual light pulse 22 and reception of the associated remitted individual light pulse 24. The individual time of flight measuring unit for example is a TDC or a block of TDCs.

In further evaluation steps, the individual times of flight are collected in an accumulator 30. Using a filter, only certain individual times of flight are taken into account, as explained in more detail below with reference to FIGS. 3 and 4.

From the accumulated individual times of flight, the distance to the object is determined in a measured value block 32 for determining a common measured value. For example, the mean is calculated. As an aside, this specification often does not distinguish between time of flight and distance, because they differ from one another only in the unit via the constant light velocity.

In a preferred embodiment, the reception path 16 is integrated on an ASIC. Separate blocks may be provided for the light reception elements of light receiver 26 on the one hand and the evaluation circuitry 28, 30, 32 on the other. Preferably, however, at least the respective individual time of flight measuring units 28 are arranged directly at the light reception elements and form intelligent pixels with individual light reception units or groups thereof. The accumulator 30 and the measured value block 32 may or may not also be integrated into these pixels. The interconnection or a higher-level controller decides whether and how the measurement results of the pixels are used in a spatially resolved manner or are spatially averaged. In another embodiment, an FPGA (Field Programmable Gate Array) is used on which the accumulator 30 and/or the measured value block 32 and possibly also the individual time of flight measuring unit 28 are implemented.

FIG. 1 shows only the measuring core 10 of an optoelectronic sensor. Elements such as a transmission or reception optical system have been omitted. The sensor can be a simple sensor that measures the object distance on one axis. This axis can be rotated by rotating mirrors or as an entire rotating measuring head and then forms a scanner. A further exemplary embodiment of the sensor is a 3D-camera.

FIG. 2 shows an exemplary histogram of a plurality, for example a thousand individual times of flight. The bins on the X-axis are time intervals of possible times of flight, here in arbitrary units, while the Y-axis represents the corresponding count of detected individual times of flight. The entire histogram therefore is a distribution of the measured individual times of flight.

The histogram shows a unique maximum, which is detected with the naked eye approximately in the 175th bin and clearly distinguishes itself from individual times of flight caused by ambient light and other interference effects. The maximum could be localized with an algorithm, and the distance of the object could be determined therefrom. However, this requires considerable memory capacities for the histogram, in particular if one considers that such a histogram needs to be stored for each pixel of a 3D image sensor.

According to the invention, therefore, no histogram as shown in FIG. 2 is accumulated and stored. Rather, the evaluation is based on the idea that the individual times of flight cluster in the vicinity of the maximum, and measurement events of interference events can be distinguished with a filter criterion derived from this idea even during the evaluation and accumulation of individual times of flight.

FIG. 3 shows a block diagram of the evaluation in the reception path 16 in an embodiment. A TDC is used as individual time of flight measuring unit 28. This provides a sequence of digital individual times of flight from the individual measurements. The TDC is started by transmitting the individual light pulse 22 and stops upon reception of the remitted individual light pulse 24 and determines the elapsed time, for example with a type of counter based on a very high-frequency clock of e.g. 20 GHz. Suitable TDC architectures are known per se in the literature.

A measured individual time of flight is forwarded by the individual time of flight measuring unit 28 to a buffer memory 34 and a filter 36. The buffer memory 34 stores at least one earlier individual time of flight as a reference value, for example the preceding individual time of flight or a history of several previous individual times of flight. The buffer memory 34 is also connected to the filter 36 via a multiplexer 38.

The filter 36 decides by means of a comparison of the currently measured individual time of flight with one or more reference values from the buffer memory 34 whether the currently measured individual time of flight coincides with at least one previously measured individual time of flight within a time window and thus is passed on to an accumulator 40 connected to the filter 36, or whether it is discarded as a singular interference event.

In the accumulator 40, those individual times of flight which successfully have passed the filter 36 are added up and counted. From that, the distance to the object is calculated, for example by means of averaging. This result can also be fed to the filter 36 via the multiplexer 38 as a further reference value.

The measuring method in the reception path 16 according to FIG. 3 then proceeds for example as follows. At the beginning of the measurement, the accumulator and the counter are reset to zero. At least the first individual time of flight is merely stored in the buffer memory 34, whereas depending on the filter criteria, a larger number of initial individual times of flight may also be required for filter initialization.

As soon as the buffer memory 34 is sufficiently filled, the next individual time of flight is compared with the stored reference values. For example, the absolute difference is formed and compared with a threshold. The individual time of flight to be evaluated is only passed on in case it is close enough to the individual time of flight stored as reference value. Alternatively, it is compared with n stored individual times of flight and a sufficient match in m, m≤n, of these comparisons is required. In this first measuring phase, the multiplexer 38 connects the buffer memory 34 to the filter 36.

An individual time of flight which is not discarded by the filter 36 as a singular interference event and thus passes on to the accumulator 40, is there added up, and at the same time the counter is increased. As an intermediate result, the average determined so far value is provided at the output of the accumulator.

The first measuring phase ends at a certain count, for example after one hundred individual times of flight have been accumulated. Then, the multiplexer 38 switches, and now the intermediate result of the measured value for the distance to the object is output to the filter 36 as a reference value. In the subsequent second measuring phase, this intermediate result can be the only reference value or taken into account in addition to the history from the buffer memory 34. The filter 36 otherwise operates as before and compares whether an individual time of flight to be evaluated is close enough to the reference values.

At another defined count, for example after one thousand individual times of flight have been determined or accumulated, the measurement is terminated, and the result is available at the output of the accumulator 40. It may be converted into a more common unit for the distance via the speed of light.

It is conceivable not to use a multiplexer 38 and to only compare the individual times of flight with one another as in the first measuring phase during the entire measurement.

A further variant is not to select a static threshold in the filter 36, but to adjust the threshold dynamically, in particular narrow the tolerance time window for a coincidence, as a fixed function or table in dependence on the count in the accumulator 40, or in dependence on the standard deviation or variance of the individual times of flight already filtered and accumulated, respectively.

The implementation of this method requires only minimal hardware costs. The filter 36 can be implemented as a subtraction stage for forming difference and absolute value, the accumulator 40 as an adder with two registers for sum and count, the buffer memory 34 as only one register or, in case of a history, a few registers, and the multiplexer 38 as a gate logic. For example, if the TDC of the individual time of flight measuring unit 28 has a bit width of b=10 and n=1024 individual times of flight are processed, then a histogram method would consume $2^b \ln(n)/(2)=10240$ one-bit registers. According to the invention, 2 (b+ln(n)/ln(2))=40 one-bit registers are enough.

FIG. 4 shows a block diagram of another embodiment of the evaluation in the reception path 16. Features shown in FIG. 3 are still present and designated by the same reference symbols, but are shown in more detail for an embodiment taking into account a history of several earlier events, in this example the four most recent events.

The input variables still are the times of flight or events x(z) from the individual time of flight measuring unit 28. They are stored in buffer memory 34 configured as a sliding memory with shift registers 42. The shift registers 42 therefore contain a history of the four most recently received individual times of flight.

The filter 36 has a total of five subtraction stages 44. The upper four of these subtraction stages 44 receive as inputs a respective reference value from the buffer memory 34 as well as the current individual time of flight from the individual time of flight measuring unit 28. The lowest subtraction stage 44a differs in that the intermediate result from accumulator 40 is input as the reference value. The respective absolute difference is compared with a thresholds in order to determine whether individual time of flight and reference value coincide within the predetermined time window. The threshold ε need not be fixed, but can be taken from the table 46 and, for example, vary with increasing count in the accumulator 40 or the variance of the common measured value determined there so far.

The outputs of the subtraction stages 44, 44a are each connected to the input of an AND-gate 46. The other input is ONE in the first measuring phase and ZERO in the second measuring phase via the multiplexer 38. The change between the measuring phases is determined in a measuring phase comparator 48 in that the count n has reached or exceeded a predetermined threshold b. Note the inversion at the second input of the lowest AND-gate 46a. This ensures that during the first measuring phase the individual times of flight from buffer memory 34 and later on the intermediate result of the accumulator 40 are taken into account as reference value.

The outputs of the AND-gates 46 are connected to the inputs of a filter comparator 50 which checks whether at least one input is ONE which thus indicates that the individual time of flight sufficiently coincides with at least one reference value. Here, at least during the first measuring phase a stricter criterion m could be selected.

The output of the filter comparator 50 is connected to an input of a further AND-gate 52 whose other input receives a clock corresponding to the sequence of the individual light pulses. The clock is therefore passed on from the further AND-gate 52 to an enable input of an adder 42 and a counter 44 of the accumulator 40 as a result of the filter 36 if and only if the individual time of flight coincides with the reference value within the time window defined by ε. Therefore only individual times of flight selected by the filter 36 are added up and counted.

The measured value block 32 finally determines the respective mean value as a quotient of the added individual times of flight of the adder 42 and the count of the counter 44. A possible comparison of the count with a termination criterion for the end of the measurement after, for example, a thousand individual measurements is not shown. Via a reset 54, the accumulator 40 can be reset for a new measurement.

The invention claimed is:

1. An optoelectronic sensor for measuring a distance to an object in a monitoring region (12), the sensor comprising:
    a light transmitter (20) for transmitting a sequence of individual light pulses (22) into the monitoring region (12),
    a light receiver (26) having at least one light reception element for receiving the individual light pulses (24) reflected or remitted by the object,
    an individual time of flight measuring unit (28) for determining a sequence of individual times of flight of the individual light pulses (22, 24) as a duration between a transmission point in time of a respective individual light pulse (22) and its reception point in time detected by the light reception element
    and an evaluation unit (30, 32) for accumulating individual times of flight and determining a common measurement value for the distance from the accumulated individual times of flight,
    wherein the evaluation unit (30) comprises a buffer memory (34), which stores at least one previous individual time of flight as a reference value, and a filter (36) for accumulating an individual time of flight only if a comparison with a reference value stored in the buffer memory (34) results, within a time window, in a coincidence of the individual time of flight and with a previous individual time of flight,
    and wherein the individual time of flight otherwise is discarded as a singular interference event.

2. The sensor according to claim 1,
wherein the evaluation unit (30) comprises an accumulator (40) for adding up individual times of flight, and a counter (44) for counting the number of added individual times of flight.

3. The sensor according to claim 2,
wherein the accumulator (40) is an adder (42).

4. The sensor according to claim 2,
wherein a count can be set in the evaluation unit (30) from which on the filter (36), additionally or as an alternative, only allows accumulation of an individual time of flight if it coincides, within the time window, with the common measurement value.

5. The sensor according to claim 1,
wherein the filter (36) comprises at least one subtracting stage (44) for forming an absolute difference of individual times of flight and comparing the absolute difference with the time window.

6. The sensor according to claim 1,
wherein the buffer memory (34) is configured as a sliding memory (42) for a plurality of previous individual times of flight, and wherein the filter (36) only allows accumulation of an individual time of flight if it coincides, within the time window, with at least one of the stored previous individual times of flight.

7. The sensor according to claim 1,
wherein the evaluation unit (30, 46) is configured to vary the time window during the accumulation of individual times of flight.

8. The sensor according to claim 7,
wherein the evaluation unit (30, 46) is configured to adapt the time window based on at least one of the number of accumulated individual light pulses and the variance of the common measurement value.

9. The sensor according to claim 1,
wherein the individual time of flight measuring unit (28) comprises a TDC.

10. The sensor according to claim 1,
wherein the light receiver (26) comprises a plurality of light reception elements and a plurality of individual time of flight measuring units (28) assigned to the light reception elements individually or in groups.

11. The sensor according to claim 1,
wherein the at least one light reception element is an avalanche photodiode operated in a Geiger mode.

12. The sensor according to claim 1,
wherein the evaluation unit (30) is at least partially integrated on the light receiver (26).

13. The sensor according to claim 12,
wherein part of the evaluation unit (30) is integrated into each light reception element or group of light reception elements.

14. A method for measuring a distance to an object in a monitoring region (12), wherein a sequence of individual light pulses (22) is transmitted into the monitoring region (12), the method comprising:
    receiving the individual light pulses (24) reflected or remitted by the object;
    determining a sequence of individual times of flight of the individual light pulses (22, 24) as a duration between a transmission point in time of a respective individual light pulse (22) and its reception point in time;
    accumulating the individual times of flight; and
    determining a common measurement value for the distance from the accumulated individual times of flight,
    wherein at least one previous individual time of flight is stored in a buffer memory (34) as a reference value and, by means of a filter (36), an individual time of flight is accumulated only if a comparison with a reference value stored in the buffer memory (34) results, within a time window, in a coincidence of the individual time of flight and with a previous individual time of flight,
    and wherein the individual time of flight otherwise is discarded as a singular interference event.

* * * * *